(12) United States Patent
Wada (10) Patent No.: US 7,224,659 B2
(45) Date of Patent: May 29, 2007

(54) DISK REPRODUCING DEVICE WITH SUPPRESSED REPRODUCTION SIGNAL ERROR

(75) Inventor: Kozo Wada, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 670 days.

(21) Appl. No.: 10/392,470

(22) Filed: Mar. 19, 2003

(65) Prior Publication Data

US 2004/0088637 A1      May 6, 2004

(30) Foreign Application Priority Data

Mar. 20, 2002    (JP) ............................. 2002-078046

(51) Int. Cl.
G11B 7/00 (2006.01)
G11B 5/09 (2006.01)

(52) U.S. Cl. .................. 369/53.35; 369/59.15; 369/59.17; 369/47.35; 369/47.25

(58) Field of Classification Search ............ 369/53.35, 369/59.15, 59.17, 47.35, 47.25
See application file for complete search history.

(56) References Cited

U.S. PATENT DOCUMENTS

| | | | | |
|---|---|---|---|---|
| 5,680,380 A * | 10/1997 | Taguchi et al. | .......... | 369/47.35 |
| 6,111,710 A * | 8/2000 | Feyh et al. | .................... | 360/46 |
| 6,204,787 B1 * | 3/2001 | Baird | ......................... | 341/139 |
| 6,259,660 B1 * | 7/2001 | Wakabayashi | ........... | 369/47.18 |
| 6,320,830 B1 * | 11/2001 | Tsukamoto et al. | ...... | 369/47.19 |
| 6,747,936 B1 * | 6/2004 | Shim | ....................... | 369/59.22 |
| 6,831,884 B2 * | 12/2004 | Hamada et al. | .......... | 369/47.28 |
| 6,876,616 B2 * | 4/2005 | Tonami | ................... | 369/59.17 |
| 6,914,861 B2 * | 7/2005 | Chou et al. | ............. | 369/47.26 |
| 6,956,914 B2 * | 10/2005 | Sivadas et al. | ............ | 375/345 |

FOREIGN PATENT DOCUMENTS

| | | |
|---|---|---|
| JP | 9-171663 | 6/1997 |
| JP | 10-188281 | 7/1998 |
| JP | 11-328858 | 11/1999 |
| JP | 2000-123490 | 4/2000 |
| JP | 3070194 | 4/2000 |
| JP | 2001-357531 | 12/2001 |
| JP | 2002-25076 | 1/2002 |
| JP | 2002-203373 | 7/2002 |

OTHER PUBLICATIONS

Patent Abstracts of Japan, Publication No. 11-328858 dated Nov. 30, 1999, 1 pg.
Patent Abstracts of Japan, Publication No. 10-188281, Publication Date: Jul. 21, 1998, 1 page.

(Continued)

Primary Examiner—William Korzuch
Assistant Examiner—Adam R. Giesy
(74) Attorney, Agent, or Firm—Osha Liang LLP (57) ABSTRACT

An RF signal that is a disk reproduction signal is binarized through an equalizer and a slicer, followed by data demodulation, and an error rate of the reproduction signal is detected in an error detection circuit. If the error rate in the error detection circuit is higher than a prescribed value, a slice balance adjustment circuit performs slice balance adjustment for the slicer and a boost adjustment circuit performs boost adjustment for the equalizer.

4 Claims, 7 Drawing Sheets

OTHER PUBLICATIONS

Patent Abstracts of Japan, Publication No. 2000-123490, Publication Date: Apr. 28, 2000, 1 page.
Patent Abstracts of Japan, Publication No. 09-1719663, Publication Date: Jun. 30, 1997, 1 page.
Patent Abstracts of Japan, Publication No. 2001-357531, Publication Date: Dec. 26, 2001, 1 page.
Patent Abstracts of Japan, Publication No. 2002-203373, Publication Date: Jul. 19, 2000, 1 page.
Patent Abstracts of Japan, Publication No. 2002-025076, Publication Date: Jan. 25, 2002, 1 page.
Partial Translation of Utility Model Registration No. 3070194, Publication Date: Jul. 18, 2000, 2 pages.
Notice of Ground of Rejection for Japanese Patent Application No. 2002-078046, Dated Mar. 12, 2004, with translation, 7 pages total.
Patent Abstracts of Japan, Publication No. 11-328858, Publication Date: Nov. 30, 1999, 1 page.

* cited by examiner

DISK REPRODUCING DEVICE WITH SUPPRESSED REPRODUCTION SIGNAL ERROR

BACKGROUND OF THE INVENTION

1. Field of the Invention

The present invention relates to a disk reproducing device reproducing a signal recorded in a disk such as an optical disk, and more particularly to a disk reproducing device capable of reducing errors of reproduction signals.

2. Description of the Background Art

Figure 7:
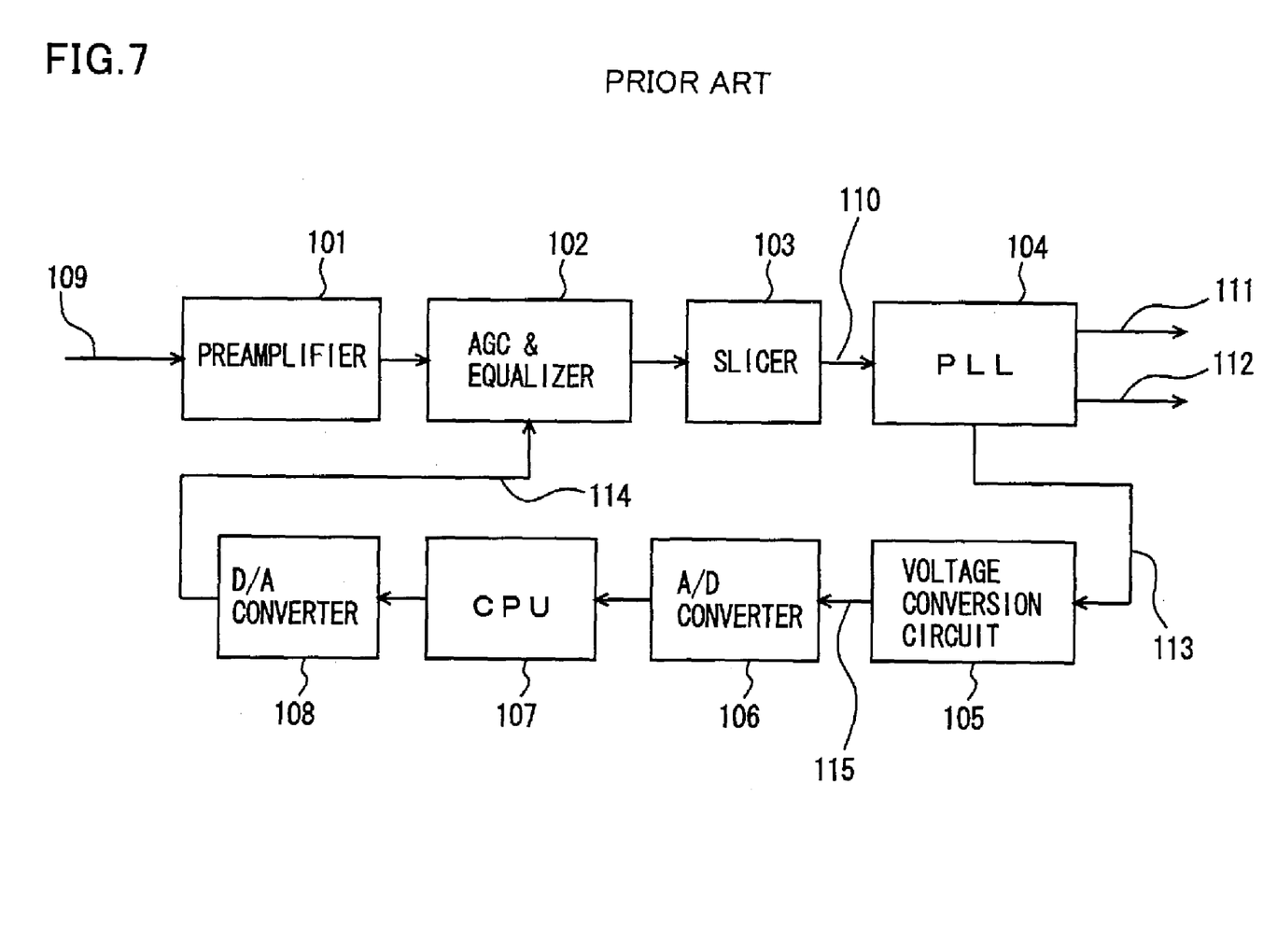
FIG. 7 is a block diagram showing a configuration of a conventional signal read process unit.

A method of adjusting reproduction signals of a disk reproducing device of interest to the present invention is disclosed, for example, in Japanese Patent Laying-Open No. 11-328858. FIG. 7 is a block diagram showing a main part of a disk reproduction signal processing portion disclosed in this publication.

Referring to FIG. 7, in the conventional disk reproducing device, an RF (Radio Frequency) signal 109 that is a disk reproduction signal from a reproducing head is amplified by a preamplifier 101 and is then output to an AGC (Automatic Gain Control) & equalizer 102. AGC & equalizer 102 absorbs reduction in the output and holds the gain constant of RF signal. A high frequency enhancing filter (equalizer) is used to remove a high frequency noise of RF signal 109 and to boost the vicinity of a high frequency component of RF signal 109 having an amplitude extremely deteriorated due to interference between codes, for waveform equalization. Thereafter, RF signal 109 is binarized in slicer 103 and a clock signal 111 is separated in a PLL (Phase Locked Loop) 104. Binarized synchronous data 112 is generated from clock signal 111 and binarized data 110. A voltage is applied to the equalizer as a boost voltage value 114 in order to specify a boost amount. A phase error pulse 113 output from PLL 104 is converted to a phase error voltage 115 in a voltage conversion circuit 105. An A/D (Analog/Digital) converter 106, a CPU (Central Processing Unit) and a D/A (Digital/Analog) converter 108 adjust phase error voltage 115 to the minimum for output as a boost voltage amount 114.

Conventionally, a reproduction signal of an optical disk has been adjusted as described above. A boost amount of the high frequency enhancing filter (equalizer) has been adjusted with phase error voltage 115 adjusted to the minimum value. Unfortunately, with only adjustment of boost amount, the error correction for an individual disk is not sufficient.

In addition, since slicer 103 conventionally has a fixed binarization slice value, an optimum correction for each disk cannot be carried out.

SUMMARY OF THE INVENTION

An object of the present invention is to provide a disk reproducing device capable of improving an error rate for each disk where the disk reproducing device reproduces information recorded in a disk such as an optical disk.

To achieve the aforementioned problem, a disk reproducing device in accordance with one aspect of the present invention includes: a high frequency enhancing filter receiving a disk reproduction signal; a binarization portion connected to the high frequency enhancing filter for binarizing the disk reproduction signal; an error detection portion connected to the binarization portion for detecting an error of the binarized disk reproduction signal; a threshold value adjustment portion connected to the error detection portion and the binarization portion for adjusting a threshold value in the binarization portion; a boost adjustment portion connected to the error detection portion and the high frequency enhancing portion for adjusting a boost amount of the disk reproduction signal input to the high fequeny enhancing filter; and a control portion controlling a threshold value of the threshold value adjustment portion and an adjustment amount of the boost adjustment portion to reduce an error detection amount in the error detection portion. The control portion causes an error rate detection at a prescribed position determined for each of the disk when an error rate by the error detection portion is higher than a prescribed value, and the boost adjustment portion performs boost adjustment using a signal having a prescribed cycle, of the reproduction signal.

In the present invention, an output signal that is binarized through the high frequency enhancing filter and the binarization portion and is subjected to error detection is used to adjust a boost amount of the high frequency enhancing filter and a threshold value of the binarization portion only when the error rate is high. In adjustment, the error rate is detected at a prescribed position determined for each disk, and boost adjustment is performed using a signal having a prescribed cycle, of the reproduction signal. Since the adjustment is made at the optimum position and with the optimum way for each disk from which a signal is reproduced, a disk reproducing device capable of easy optimum error correction for each disk can be provided.

In accordance with another aspect, a disk reproducing device includes: a high frequency enhancing filter receiving a disk reproduction signal; a binarization portion connected to the high frequency enhancing filter for binarizing the disk reproduction signal; an error detection portion connected to the binarization portion for detecting an error of the binarized disk reproduction signal; a threshold value adjustment portion connected to the error detection portion and the binarization portion for adjusting a binarization threshold value in the binarization portion; and a control portion for controlling a threshold value of the threshold value adjustment portion to reduce an error detection amount in the error detection portion.

An output signal that is binarized through the high frequency enhancing filter and the binarization portion and is subjected to error detection is used to adjust a slice level that is a threshold value in the binarization portion so as to reduce an error rate. Since the slice level is adjusted to reduce the error for each disk from which a signal is reproduced, the error rate can be improved for each disk, and a disk reproducing device capable of reproducing recorded data at the optimum state can be provided.

Here, a disk from which a signal is reproduced may be a DVD (Digital Versatile Disc) or a CD (Compact Disc). Alternatively it may be a recordable disk.

In the adjustment of the slice level, the slice level is preferably adjusted in accordance with the asymmetry of RF signal with reference to the error rate. The slice level may be changed by adding an offset to the slice level. As a result, the error rate is prevented from deteriorating due to asymmetry of RF signal and is also optimized.

More preferably, the disk reproducing device described above further includes a boost adjustment portion connected to the error detection portion and the high frequency enhancing filter for adjusting a boost amount of the disk reproduction signal input to the high frequency enhancing filter. The control portion controls an adjustment amount of the boost adjustment portion to reduce an error detection amount in the error detection portion. Since not only the slice level of the binarization portion but also the boost amount of the disk reproduction signal input to the high frequency enhancing portion is adjusted, the error rate is further improved.

More preferably, the control portion is operated when an error rate by the error detection portion is higher than a prescribed value.

Since the slice level for the binarization portion and the boost amount for the high frequency enhancing filter are adjusted only when the error rate is high, the error rate is improved only when required.

More preferably, the error detection portion performs error rate detection at a prescribed position determined for each of the disk. The prescribed position is preferably a position where an error of data of 4ECC block can be detected.

More preferably, the boost adjustment portion performs boost adjustment using a signal having a prescribed cycle, of the reproduction signal. The prescribed cycle is preferably 3T.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

In the following, an embodiment of the present invention will be described with reference to the figures.

Figure 1:
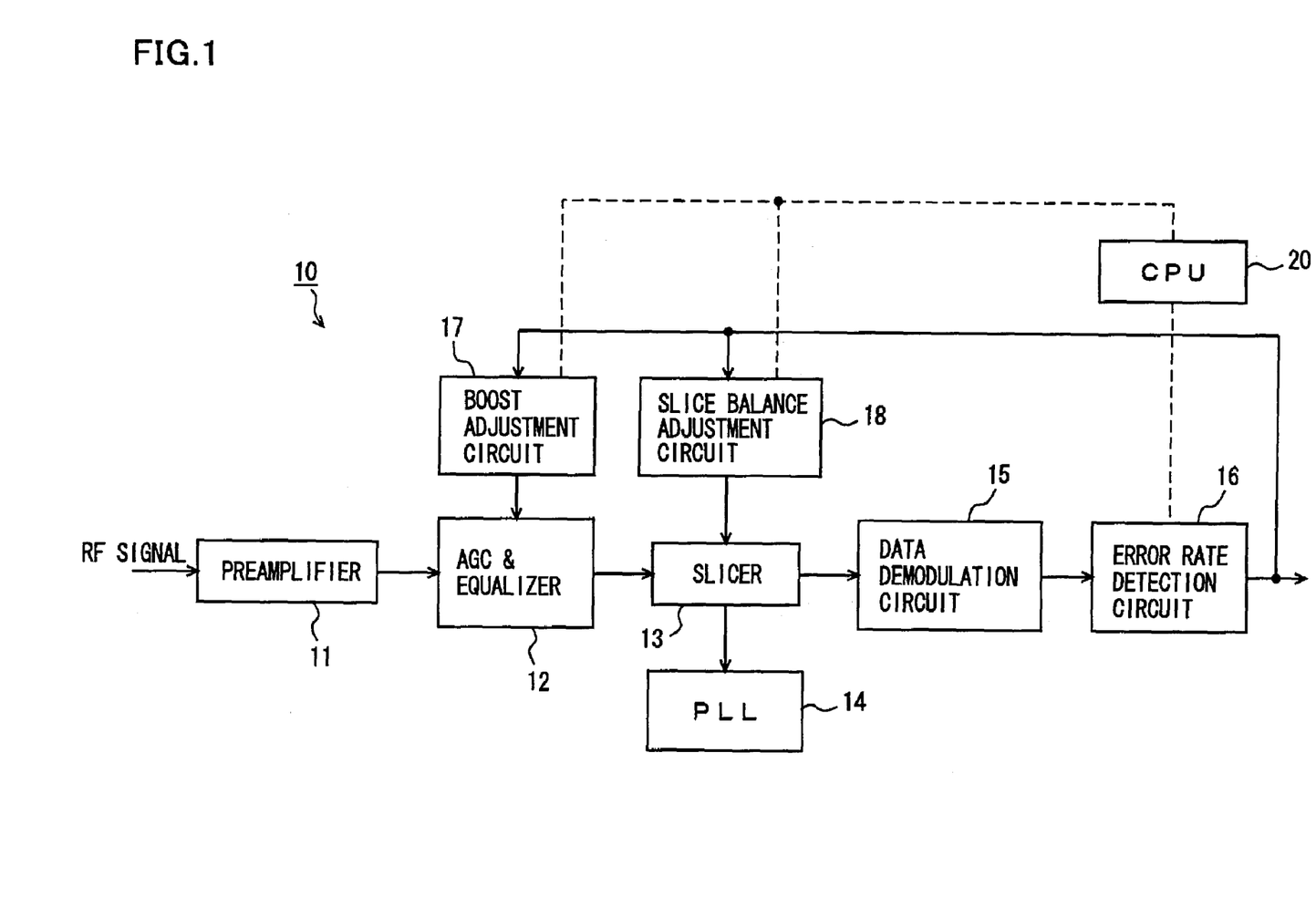
FIG. 1 is a block diagram showing a configuration of a signal reading process unit.

FIG. 1 is a block diagram showing a main part of a signal read process unit 10 of a disk reproducing device for as an optical disk or the like in accordance with the present invention. Referring to FIG. 1, signal read process unit 10 includes a preamplifier 11 amplifying an RF signal that is a reproduction signal from a reproducing head (not shown), an AGC & equalizer 12 connected to preamplifier 11, a slicer 13 connected to AGC & equalizer 12 for binarizing the boosted RF signal with a prescribed threshold value, a PLL (Phase Locked Loop) circuit 14 generating a clock signal, a data demodulation circuit 15 connected to slicer 13 for demodulating the binarized data, an error rate detection circuit 16 detecting an error of the binarized signal demodulated in data demodulation circuit 15, a boost adjustment circuit 17 connected to error rate detection circuit 16 and AGC & equalizer 12 for adjusting a boost amount in equalizer 12 to reduce an error rate in error rate detecting circuit 16, a slice balance adjustment circuit 18 connected to error rate detection circuit 16 and slicer 13 for adjusting a threshold value in binarization by slicer 13 to reduce an error rate in error rate detection circuit 16, and a CPU (Central Processing Unit) 20 as a control unit to control error rate detection circuit 16, boost adjustment circuit 17 and slice balance adjustment circuit 18. AGC & equalizer 12 has AGC receiving the RF signal output from the preamplifier for absorbing the reduced output and holding the gain constant, and a high frequency enhancing filter (referred to as an equalizer hereinafter) removing a high frequency noise of the RF signal and boosting the vicinity of high frequency component of the RF signal having the amplitude extremely deteriorated due to interference between codes. The reproduction signal from which an error is detected in error rate detection circuit 16 is sent to an output circuit (not shown).

Figure 2:
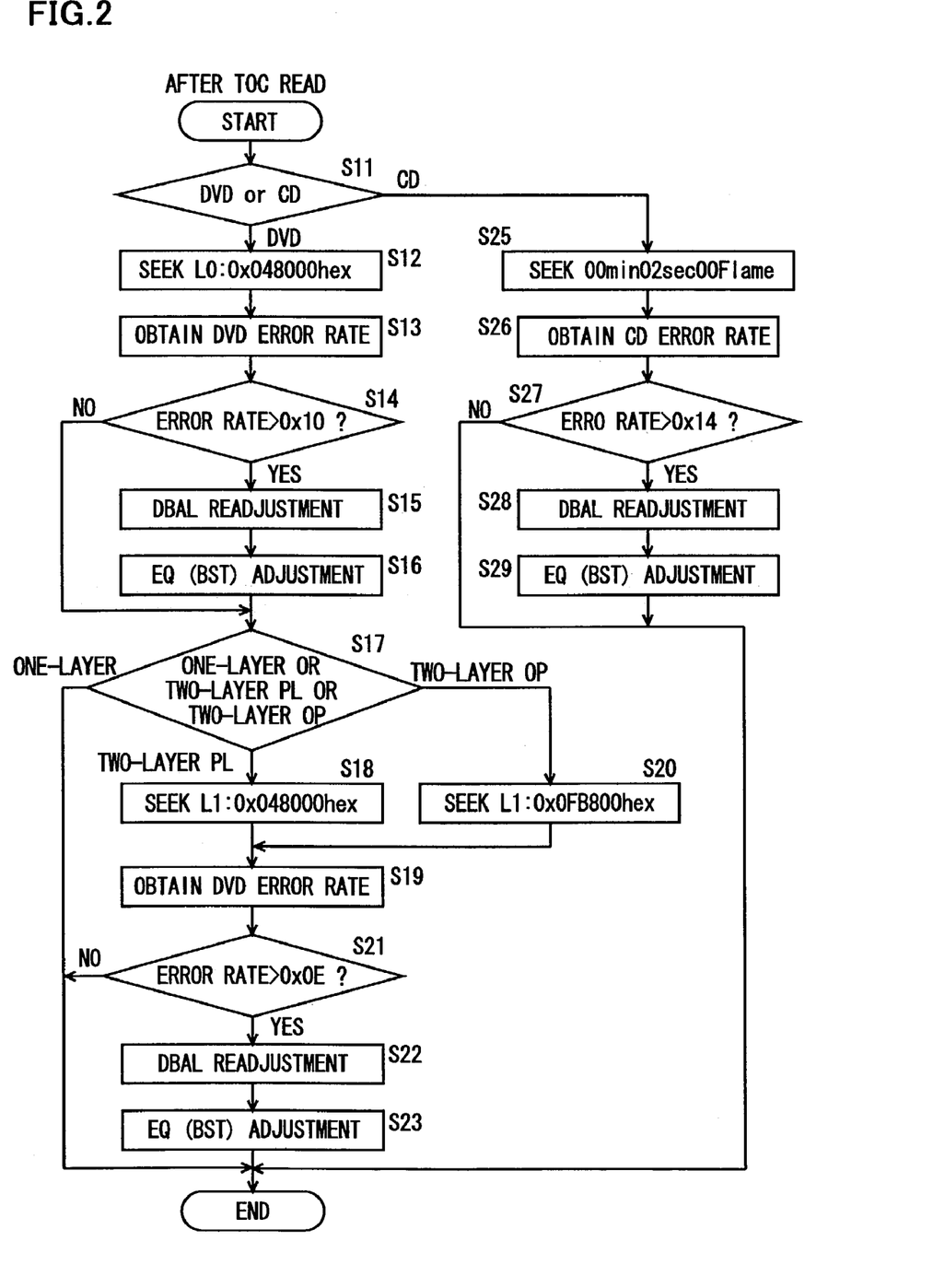
FIG. 2 is a flow chart showing a control procedure of CPU controlling the signal read process unit.

The operation of signal read process unit 10 will now be described. FIG. 2 is a flow chart illustrating the operation of CPU 20 controlling signal read process unit 10.

Referring to FIG. 2, when reading of TOC (Table of Contents) of the disk is completed, it is determined whether the disk is a DVD (Digital Versatile Disc) or a CD (Compact Disc) (S11). If it is determined as a DVD (DVD at S11), a head (not shown) is moved to an address 'L0:0x048000hex' to obtain an error rate in error rate detecting circuit 16 (S12).

In the present invention, the error rate is improved by adjusting the balance of slicer 13 as described later. Therefore an optimum adjustment cannot be accomplished when the error rate is a non-reliable value due to the other factor, for example, a scratch on the disk, that is, when the error rate at the same address is not constant due to a scratch. To eliminate this, data is obtained at a prescribed region.

Figure 3:
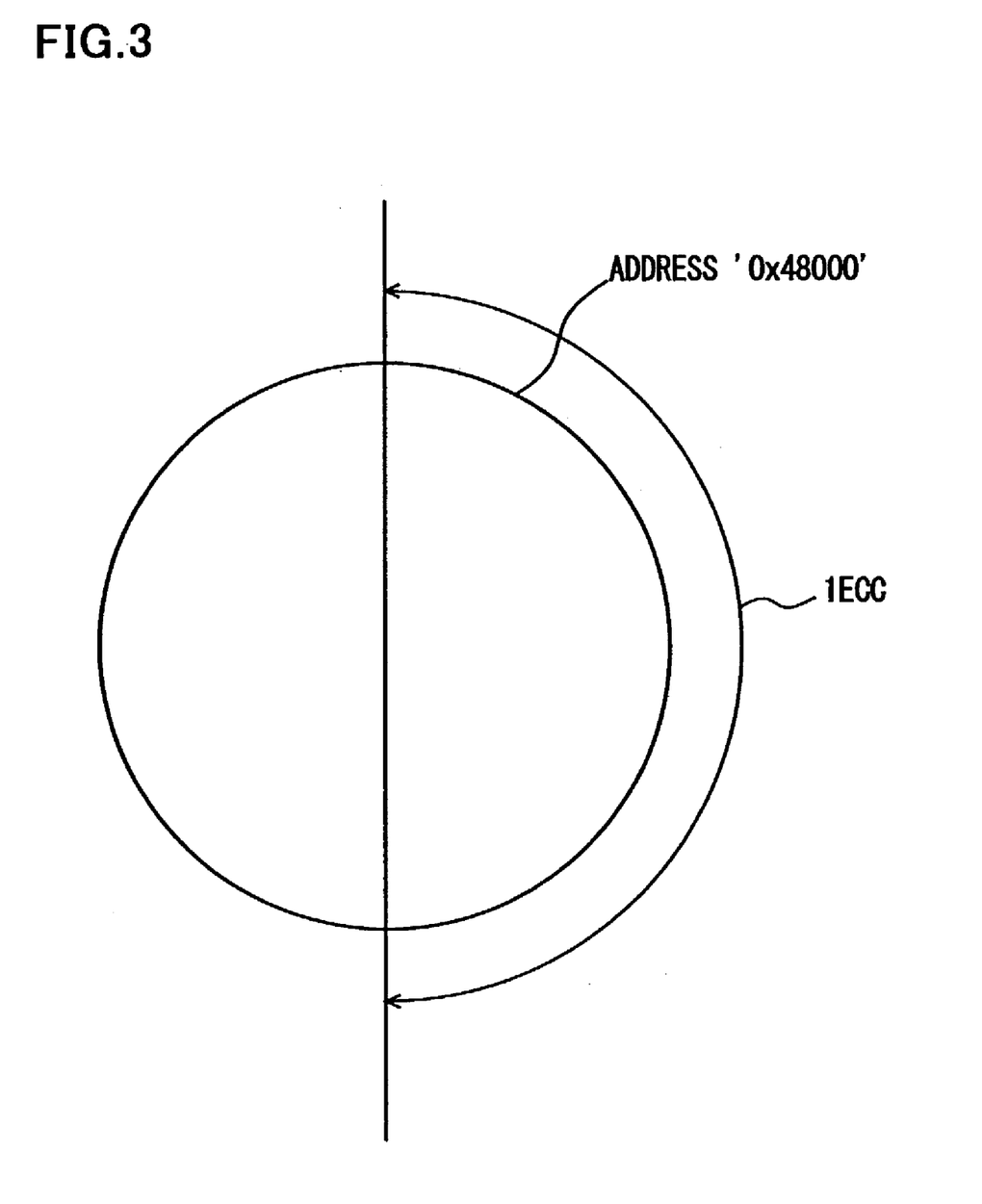
FIG. 3 is a diagram illustrating the concept of ECC on a disk.

Referring to FIG. 3, the reason why data is obtained at a prescribed region will be described. FIG. 3 is a diagram illustrating the concept of ECC (Error Collection Code) on a disk. Since the disk employs CLV (Constant Linear Velocity), the length per circumference is increased at the inner circumference. Furthermore, in the outer circumference, it takes time to move the pickup, and therefore it is preferable for a disk reproducing device to read data at the inner circumference of the disk where possible.

On the other hand, the error rate is obtained per unit of ECC. Referring to FIG. 3, the address '0x048000hex' is a position where 1ECC corresponds to half the circumference and 4ECC corresponds to twice the circumference. In other words, the effect of scratch may be 3ECC at worst at the inner circumference from this address, and the seek time is longer at the outer circumference from this address. Here '0x048000hex' is therefore sought.

It is noted that it is not always necessary to read 4ECC. The more accurate error rate for comparison can be obtained with more data. However, it takes time to read more. To read less causes a loss in the accuracy of data for comparison.

L0 at the address at S12 indicates Layer 1, a layer of the disk. In a case of a two-layer disk, the layer of L1 is sought as shown later.

Returning to FIG. 2, the error rate of DVD is obtained in error rate detecting circuit 16 (S13). The error rate is obtained by extracting the best value and the second best value within the range of 4ECC described above. Here, the number of errors in DVD is determined, for example, from the sum of the number of PI (Parity Inner-code) corrections and the number of P0 (Parity of Outer-code) corrections.

Then, it is determined whether the error rate is higher than a prescribed value, for example, 0x10 (S14). When it is determined that the error rate is higher than a prescribed threshold value (YES at S14), the balance (binarization threshold value) of slicer 13 is adjusted to improve the error rate (S15). It is noted that DBAL here represents the balance of the slice value of data. Thereafter a boost adjustment of equalizer 12 is performed (S16). The boost adjustment of equalizer 12 uses a signal in the vicinity of 3T signal of RF signal. This is because the signal in that vicinity has a high frequency of occurrence.

As described above, in the present embodiment, the slice level is adjusted with reference to the error rate of data of reproduction signal. Therefore if the error rate is low, only the slice level may be adjusted. It is noted that the threshold value of this error rate is not limited to 0x10 and may be set at any value.

Returning to FIG. 2, when the error rate is lower than a first threshold value 0x10 at S14 (NO at S14), S17 follows to detect the error rate in the second layer of the optical disk.

The method of determining the slice level as shown in S15 will now be described.

Figure 4A:
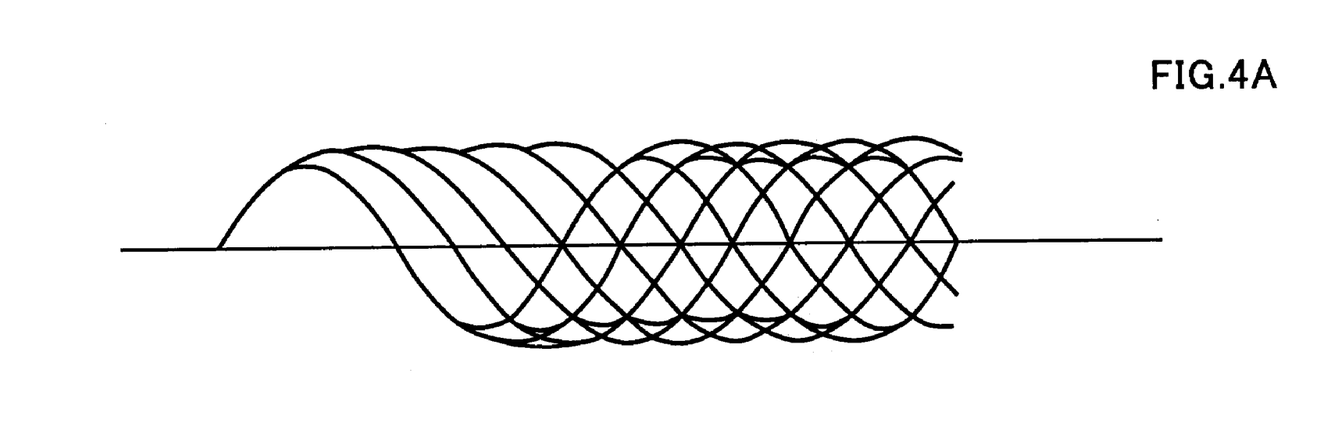
FIGS. 4A and 4B are diagrams illustrating a shifted center of eye pattern of RF signal.
Figure 4B:
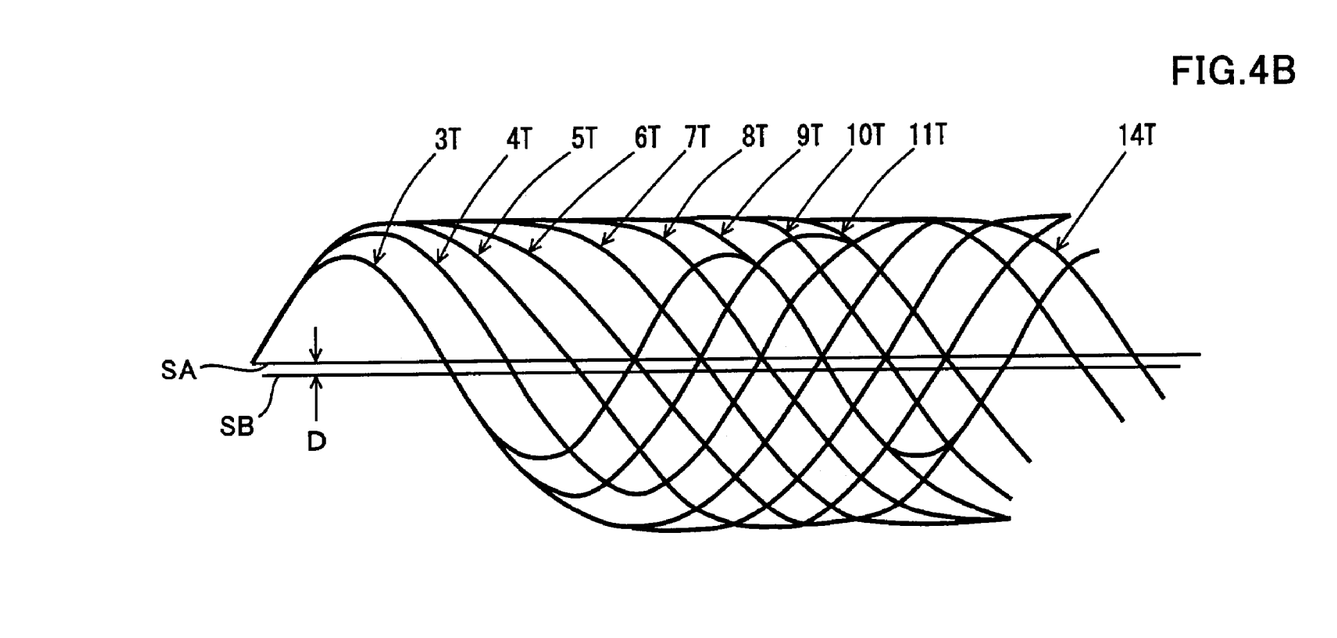

FIGS. 4A and 4B are diagrams showing exemplary signals of 3T–14T of RF signal. Usually, it is ideal that signals 3T–14T of RF signal are identical in DC component, that is, they are symmetrical (see FIG. 4A). In actuality, however, things are different (see FIG. 4B). Referring to FIG. 4B, slicer 13 is designed to operate to follow the DC components of RF signals including 3T, 4T, 5T, 6T, 7T, 8T, 9T, 10T, 11T, 14T signals, to some extent. In the slice level adjustment in slice balance adjustment circuit 18, the slice level is adjusted in accordance with the asymmetry of RF signals with reference to the error rate. Specifically CPU 20 performs the following processes.

If the RF signals do not have asymmetry, the DC components from 3T signal to 14T signal are the same with the equal slice level, and therefore each T signal is normally binarized with a low error rate. RF signals having asymmetry results in the slice level SA close to the DC components of 3T signal, 4T signal, 5T signal with a high frequency of occurrence (see FIG. 4B).

With the slice level described above, 11T signal and particularly 14T signal with a low frequency of occurrence cannot be detected correctly. Since 14T signal is a Sync (head) portion for synchronizing data, the error rate will be extremely increased if 14T signal cannot be detected. Therefore offset D is here added to change slice level SA to slice level SB as shown in FIG. 4B. Although the changed slice level in this manner reduces the detection accuracy of 3T signal, 4T signal as compared with slice level SA in FIG. 4B, the error rate according to the disk is improved as a result by reliably detecting 14T signal.

Turning back again to FIG. 2, it is determined whether DVD disk has one layer, two-layer PL (Parallel Layer) or two-layer OP (Opposite Layer) (S17). If the optical disk has one layer (one layer at S17), the process will end here. If the optical disk has two-layer PL (two-layer PL at S17), the reproducing head is moved to a prescribed value L1:0x048000hex, which is a position corresponding to S12 in two-layer PL (S18). If it is determined that the optical disk has two-layer OP (two-layer OP at S17), the reproducing head is moved to L1:0x0FB800hex, which is a position corresponding to S12 in two-layer OP (S20). The error rate in the DVD second layer is then obtained (S19).

Thereafter it is determined whether the error rate is higher than a prescribed threshold value '0x0E' in the second layer (S21). If it is determined that the error rate is higher than a prescribed threshold value '0x0E', the balance adjustment for slicer 13 and the boost adjustment for equalizer are performed in the second layer (S22, S23). It is noted that the detail is the same as S15 and S16 described above.

If the error rate is lower than the threshold value (0x0E) in the second layer at S21 (NO at S21), the process will end here.

If it is determined that the optical disk is CD at S11 (CD at S11), the head is moved to '00min02sec00Flame', which is the innermost circumference of data of CD (S25). This is because at present the number of errors can be obtained only per unit of 2048 frames in CD. However, also in the case of CD, the present invention is not limited thereto and the error may be obtained at any position.

Thereafter the error rate in CD is obtained (S26). The error rate in CD is the sum of the number of C1 correction frames and the number of C2 correction additional frames as converted.

It is determined whether the obtained error rate is higher than a prescribed threshold value (0x14) (S27). If it is determined that the error Irate is higher than a prescribed threshold value (YES at S27), the balance adjustment for slicer 13 and the boost adjustment for the equalizer are performed in a manner similar to DVD (S28, S29). It is noted that the prescribed threshold value is not limited to this value and any value may be used. The manner of the balance adjustment and the boost adjustment is similar to that in S15 and S16.

If the error rate is lower than a prescribed value (0x14) at S27 (NO at S27), the process will end here.

Figure 5:
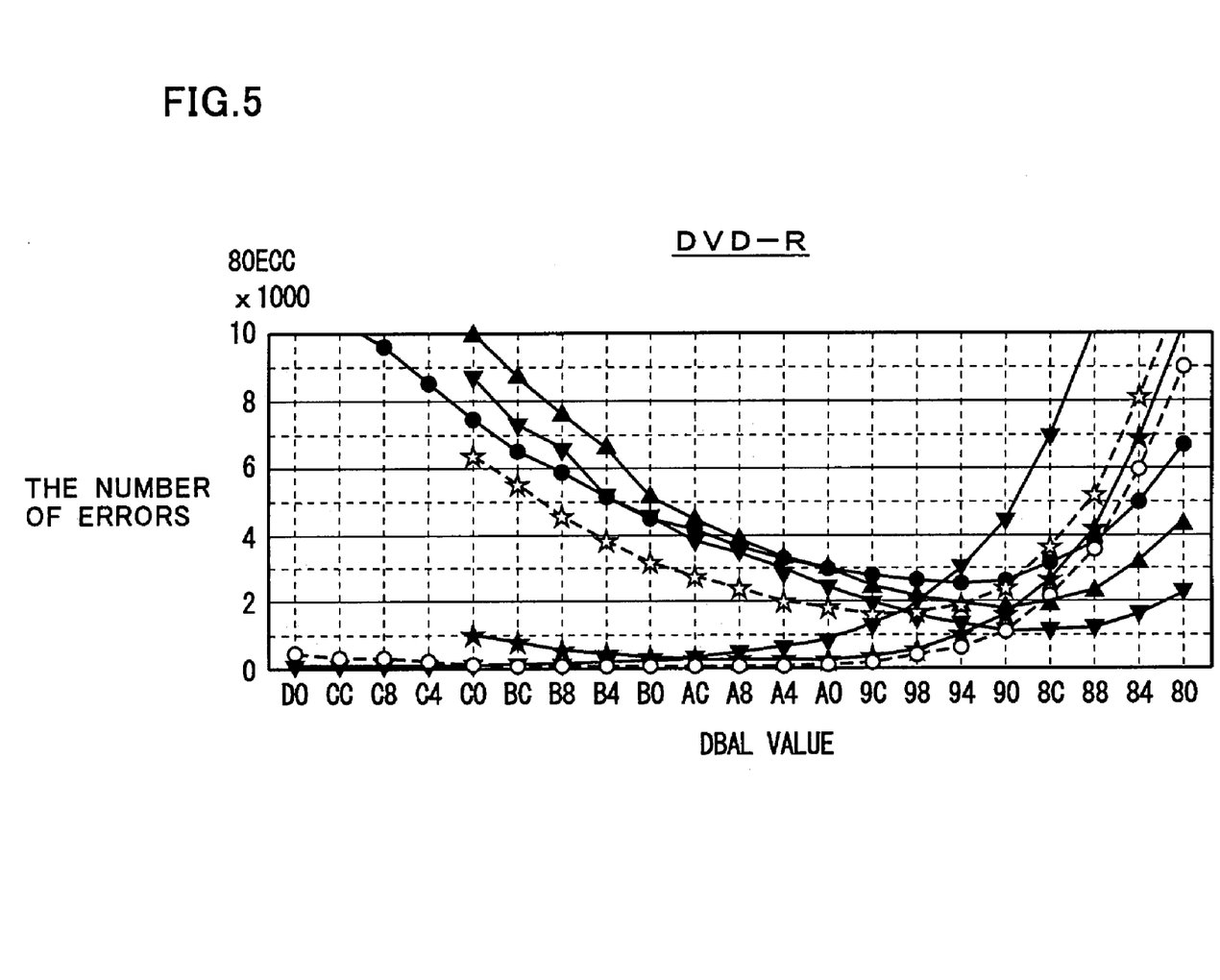
FIG. 5 shows the number of errors and DBAL values in one of a variety of disks.
Figure 6:
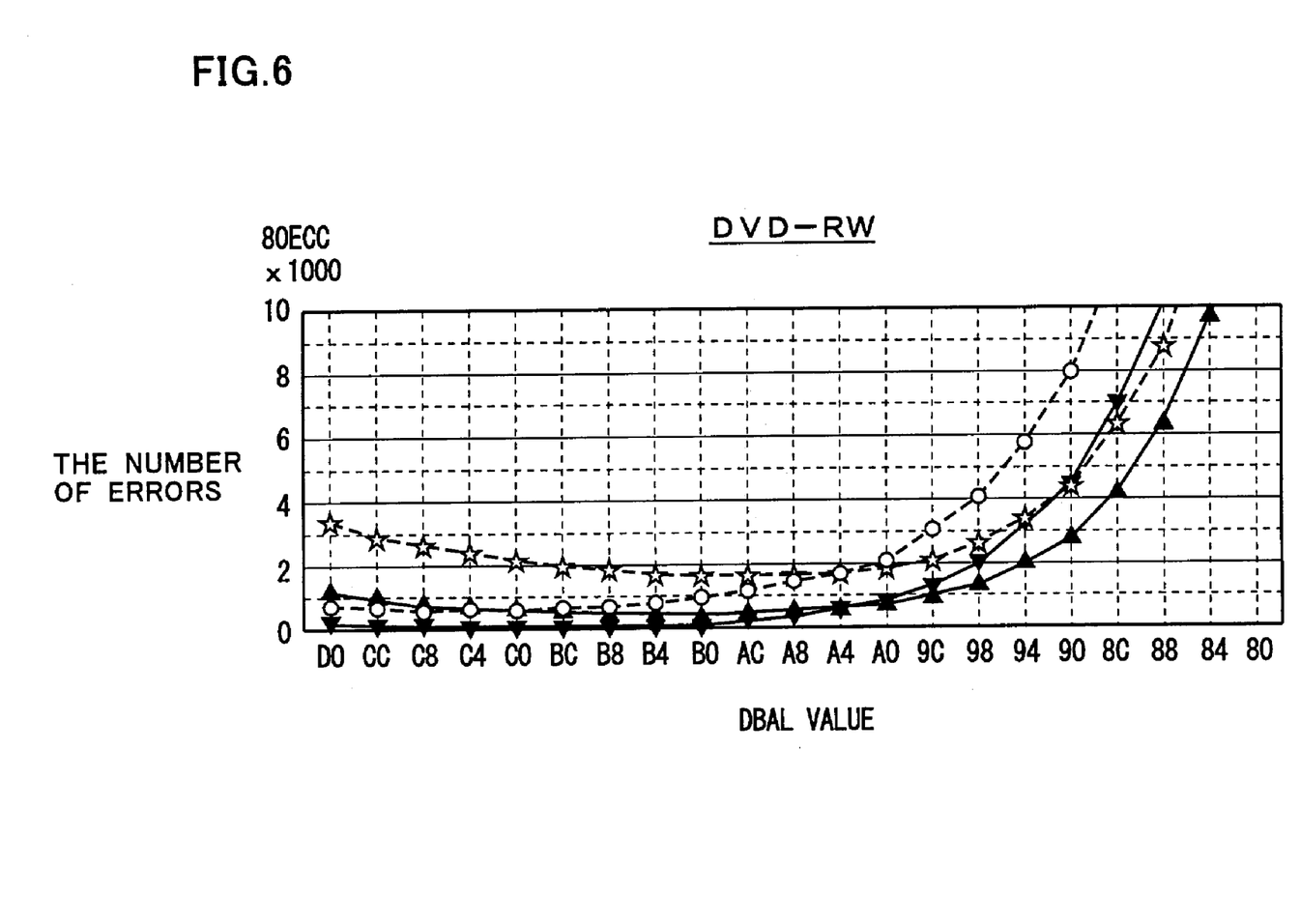
FIG. 6 shows the number of errors and DBAL values in one of a variety of disks.

As a specific example for each disk, FIG. 5 shows the relation between the number of errors (error rate) and DBAL values in a DVD-R and FIG. 6 shows the relation between the number of errors and DBAL values in a DVD-RW. Referring to FIGS. 5 and 6, it can be seen that the quality and the symmetry in RF signal vary with disks in which signals are recorded. Therefore it can be understood that the balance value for slicer 13 has to be varied with individual disks.

It is noted that although the error rate in the present invention is determined from the sum of the number of PI corrections and the number of PO corrections in DVD and from the sum of the number of C1 correction frames and C2 correction additional frames as converted in CD, the present invention is not limited thereto and either one or the other value may be used in each case.

Furthermore, while the slice level adjustment and the boost adjustment have been described as being performed sucessively in DVD two-layer and CD, only one of the slice level adjustment and the boost adjustment may also be performed in a manner similar to DVD one-layer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disk reproducing device comprising:
a high frequency enhancing filter receiving a disk reproduction signal and boosting selected high-frequency components of the disk reproduction signal;
binarization means receiving an output of said high frequency enhancing filter for binarizing said disk reproduction signal;
error detection means receiving an output of said binarization means for detecting an error of the binarized disk reproduction signal;
threshold value adjustment means receiving an output of said error detection means and connected to said binarization means for adjusting a binarization threshold value in said binarization means;

boost adjustment means receiving an output of said error detection means and connected to said high frequency enhancing filter for adjusting a boost amount of the disk reproduction signal input to said high frequency enhancing filter; and control means controlling a threshold value of said threshold value adjustment means and an adjustment amount of said boost adjustment means to reduce an error detection amount in said error detection means, wherein said control means causes an error rate detection at a prescribed position for each disk input into said disk reproducing device and an adjustment of the binarization threshold value when an error rate by said error detection means is higher than a prescribed value at said prescribed position, and wherein said boost adjustment means performs boost adjustment using a signal having a prescribed cycle of said reproduction signal.

2. A disk reproducing device comprising:

a high frequency enhancing filter receiving a disk reproduction signal and boosting selected high-frequency components of the disk reproduction signal;

binarization means receiving an output of said high frequency enhancing filter for binarizing said disk reproduction signal;

error detection means receiving an output of said binarization means for detecting an error of the binarized disk reproduction signal, wherein said error detection means performs error rate detection at a prescribed position for each disk input into said disk reproduction device;

threshold value adjustment means receiving an output of said error detection means and connected to said binarization means for adjusting a binarization threshold value in said binarization means; and control means for controlling a threshold value of said threshold value adjustment means to reduce an error detection amount in said error detection means, wherein said control means reduces the error detection amount when an error rate by said error detection means is higher than a prescribed value.

3. The disk reproducing device according to claim 2, further comprising boost adjustment means receiving an output of said error detection means and connected to said high frequency enhancing filter for adjusting a boost amount of the disk reproduction signal input to said high frequency enhancing filter, wherein said control means controls an adjustment amount of said boost adjustment means to reduce the error detection amount in said error detection means.

4. The disk reproducing device according to claim 3, wherein said boost adjustment means performs boost adjustment using a signal having a prescribed cycle of said reproduction signal.

* * * * *